United States Patent [19]

Schwarz et al.

[11] Patent Number: 5,364,416
[45] Date of Patent: Nov. 15, 1994

[54] REACTIVE DYESTUFF MIXTURES

[75] Inventors: Max Schwarz, Leverkusen; Joachim Grütze, Odenthal; Dietrich Hildebrand, Odenthal; Joachim Wolff, Odenthal; Frank-Michael Stöhr, Odenthal, all of Germany

[73] Assignee: Bayer Aktiengesellschaft, Leverkusen, Germany

[21] Appl. No.: 981,030

[22] Filed: Nov. 24, 1992

[30] Foreign Application Priority Data

Dec. 4, 1991 [DE] Germany ............................ 4139954

[51] Int. Cl.$^5$ ..................... C09B 67/22; C09B 67/24; D06P 1/382; D06P 3/66
[52] U.S. Cl. .......................................... 8/549; 8/639; 8/641
[58] Field of Search ................... 8/638, 639, 641, 549

[56] References Cited

U.S. PATENT DOCUMENTS 4,338,093  7/1982  Hildebrand et al. ............... 8/549
5,196,033  3/1993  Taylor .................................. 8/549

FOREIGN PATENT DOCUMENTS 0044483  1/1982  European Pat. Off. ....... D06P 3/66
2605620  8/1977  Germany ...................... D06P 3/26
3801112  6/1989  Germany ...................... C09B 62/04
1032503  6/1966  United Kingdom .

OTHER PUBLICATIONS

S. Abeta et al., American Dyestuff Reporter, 1984, pp. 26–31.

Primary Examiner—Paul Lieberman
Assistant Examiner—Margaret Einsmann
Attorney, Agent, or Firm—Sprung Horn Kramer & Woods

[57] ABSTRACT

Improved reactive dyestuff mixtures comprise a reactive dyestuff of the formula (I)

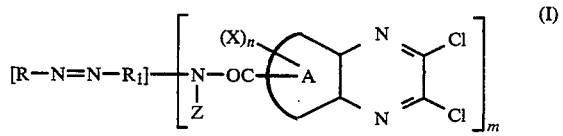

and a chlorotriazine dyestuff of the formula

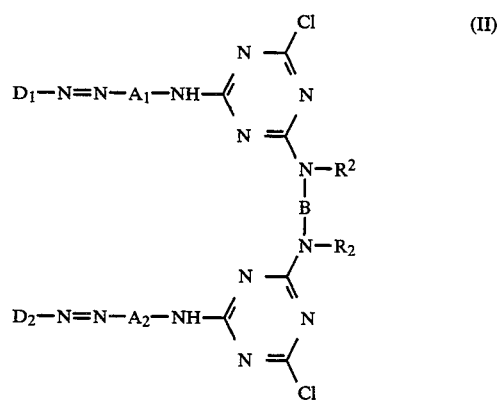

wherein the substituents have the meaning given in the description.

9 Claims, No Drawings

REACTIVE DYESTUFF MIXTURES

The invention relates to mixtures of reactive dyestuffs, preferably of the same hue and different reactivities and substantivity, which have improved absorption properties, compared with the individual components, during dyeing of cellulose or regenerated cellulose fibres.

Reactive dyestuffs are used in the form of their individual components or in the form of mixtures of different dyestuffs for dyeing cellulose fibres. In the case of mixtures, the reactivities of the individual components of the mixture should as far as possible be identical or at least similar, in order to ensure that the dyestuffs are compatible during the dyeing process and thus achieve a solid appearance of the goods. If reactive dyestuffs have widely different reactivities, they are regarded as belonging to dyestuff ranges which differ from one another and have to be applied under different alkali and temperature conditions. In current usage, reactive dyestuffs are divided into three groups on the basis of their different reactivities: reactive dyestuffs of high reactivity which can be applied for dyeing at below 40° C. are called cold-dyeing dyes, dyestuffs which are applied at 40° to 60° C. are called warm-dyeing dyes, and dyestuffs which are applied in the region of 80° C. are called hot-dyeing dyes. Because of their different reactivities and substantivities, the three groups of dyestuff ranges are applied according to processing directions specific to the group.

The difference between applying a warm-dyeing dye and a hot-dyeing dye is, for example, that the hot-dyeing dye is applied at a dyeing temperature which is 20° to 40° C. higher, an electrolyte concentration which is 40 g/l of sodium chloride higher and a sodium carbonate concentration of the dyebath which is 10 g/l higher.

The invention is based on the object of providing a dyestuff mixture which shows a uniformity of the fixation process superior to that of the individual dyestuffs, coupled with a good yield of fixation.

The invention relates to a reactive dyestuff mixture of dyestuffs which preferably produce shades of the same hue, characterised in that it comprises in each case at least one dyestuff having a dichloroquinoxaline reactive group, of the formula

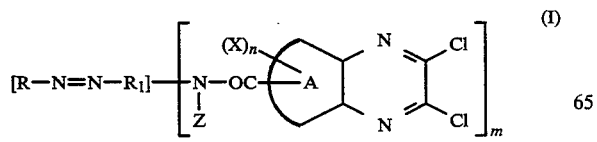

(I)

wherein

A denotes a five- to six-membered carbocyclic or heterocyclic ring, in particular phenyl, X denotes hydrogen or a substituent customary for azo dyestuffs, in particular optionally substituted alkyl, aralkyl and aryl radicals, sulphonic acid, carboxylic acid and halogen substituents, such as chlorine and bromine substituents, and furthermore nitro, hydroxyl, alkoxy, cyano, sulphone and optionally substituted sulphonamide groups, and acid ester groupings, such as sulphonic acid and carboxylic acid ester groups, Z denotes hydrogen or a substituent customary for azo dyestuffs, preferably hydrogen or an alkyl group, R denotes the radical of a diazo component of the benzene or naphthalene series which optionally contains further azo groups, $R_1$ denotes the radical of an azo component, m denotes 1 or 2, n denotes an integer from 1 to 3, preferably of the formula I.1

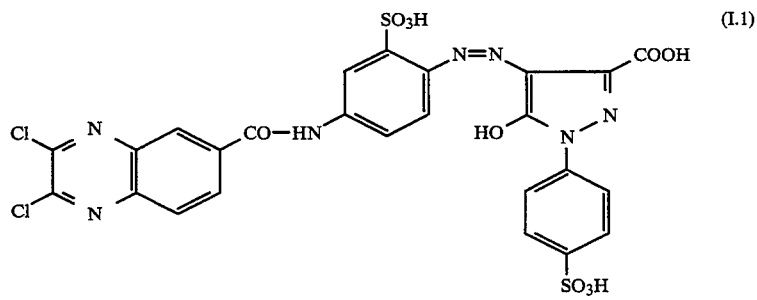

and at least one chlorotriazine dyestuff of the general formula (II)

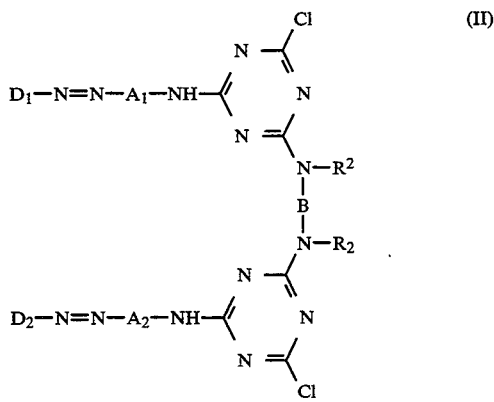

wherein $R_2$ independently of one another denote H or $C_1$-$C_4$-alkyl, $D_1$ and $D_2$ denote components having the structure

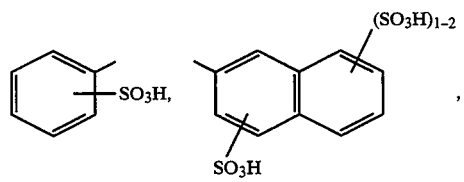

-continued
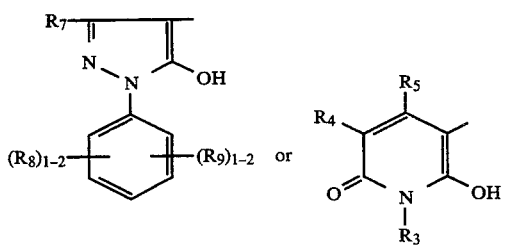
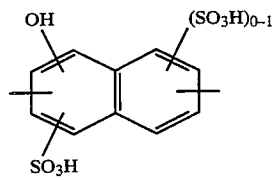
where
R_3 = CH_3 or C_2H_5,
R_4 = COOH or CONH_2,
R_5 = CH_3,
R_7 = CH_3 or COOH,
R_8 = H or SO_3H and
R_9 = H, Cl or CH_3,
A_1 and A_2 independently of one another denote
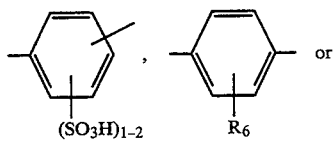
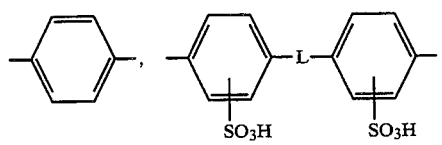
where
R_6 = CH_3, C_2H_5, NHCO—NH_2 or NH—CO—CH_3,
and
B denotes
where
L = a single bond, NH—CO—NH or —CH=CH—.
Particularly preferred dyestuffs II are:
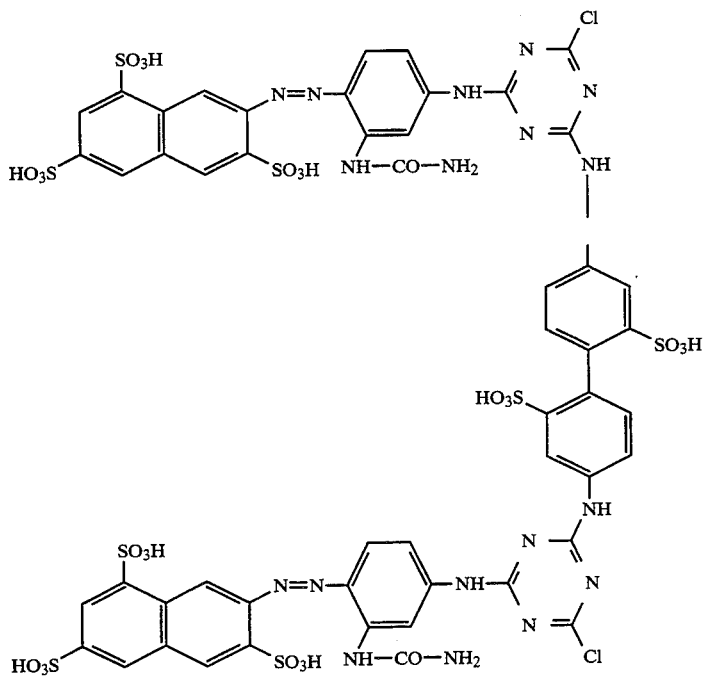
II.1
or -continued
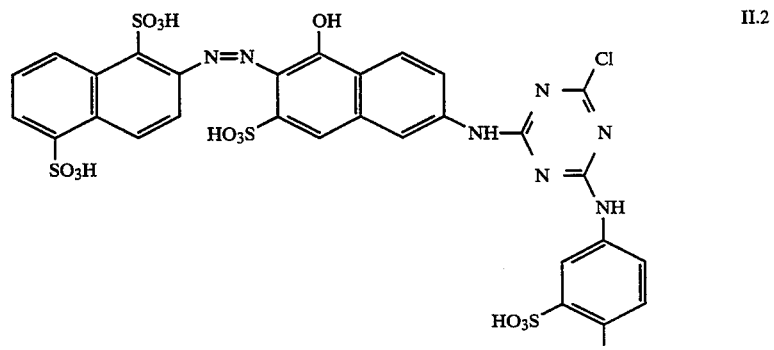
II.2
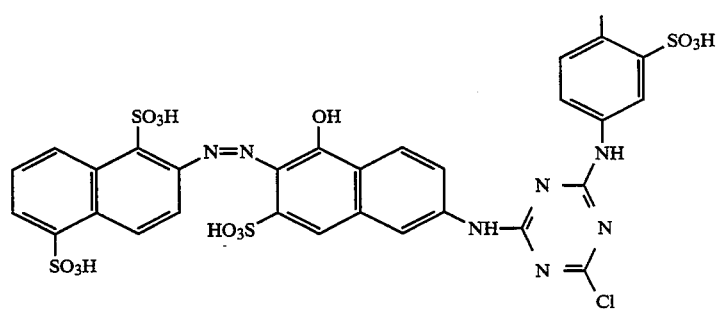
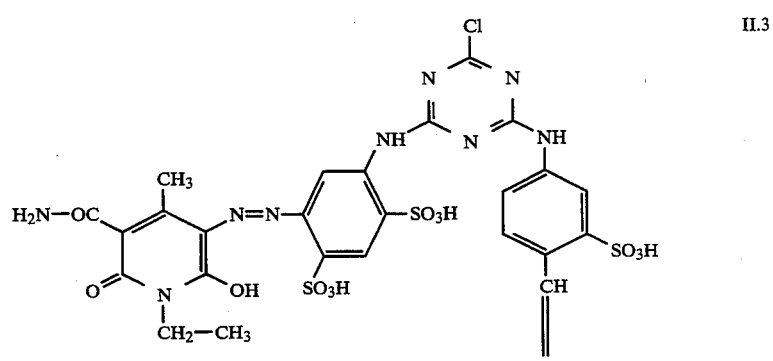
II.3
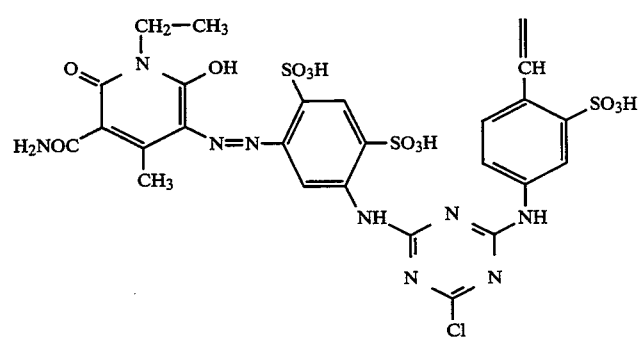

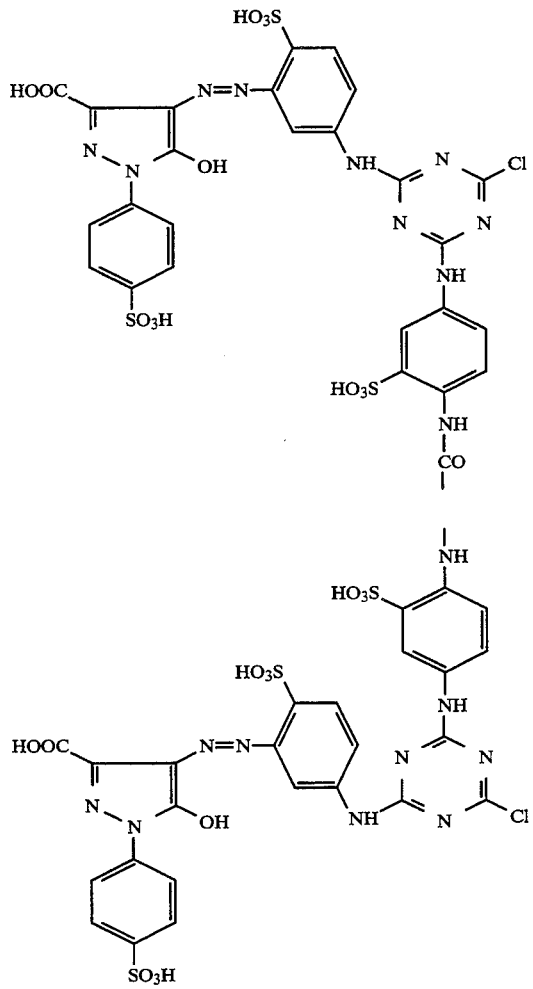

II.4

Dyestuff mixtures with dyestuffs of the formula (II) are already known from EP-A-478,503. However, there is no indication of the use of dyestuffs of the formula (I).

The dyestuff mixture can preferably be used for dyeing cotton and other cellulose fibres by the exhaust method on customary dyeing units.

Dyeing temperatures of 40° C. to 80° C. are possible, the preferred dyeing temperature is 60° C., and the preferred starting temperature is 30° C., in accordance with the following dyeing procedure:

| Time (minutes) | Temperature (°C.) | Measure |
| --- | --- | --- |
| 0 | 30 | Addition of dyestuff |
| 10 | 30 | Addition of salt, in particular Na$_2$SO$_4$, NaCl |
| 30 | 30 | Addition of fixing agent, in particular sodium carbonate, NaOH |
| 60 | 30 Â 60 | Heating up to 60° C. |

The preferred reactive dyestuff mixtures comprise 20 to 80 parts by weight of at least one dyestuff of the formula (I) and 80 to 20 parts by weight of at least one dyestuff of the formula (II), these parts by weight together making 100. Other dyestuffs or customary auxiliaries can additionally be employed. In particular, the dyestuff mixtures according to the invention comprise, per 100 parts of dyestuff, 1 to 50 parts of an inorganic salt, such as, for example, sodium chloride or sodium sulphate. The mixtures according to the invention furthermore preferably comprise a buffer, in particular an inorganic buffer, which results in a buffering range of between pH 6.5 and 7.5. For better handling, the mixtures according to the invention preferably comprise dispersing agents, in particular 0.5 to 10 parts by weight of an organic anionic dispersing agent, based on the total mixture, and a dustproofing agent, preferably 0.5 to 5 parts by weight, based on the total mixture.

EXAMPLE 1000 parts of an aqueous dye liquor at 30° C. are entered with 100 parts of knitted cotton goods and 2 parts of reactive dyestuff mixture. This dyestuff mixture comprises 1 part each of the dyestuff of the formula (I.1) and of the dyestuff of the formula (II.1).

After the dyestuff mixture has become uniformly dispersed in the liquor and on the cotton, 50 parts of sodium chloride are introduced into the dyeing liquor, and 20 parts of sodium carbonate are then added. The dyeing liquor is heated to 60° C. in the course of 30 minutes, with vigorous agitation of the liquor and goods, and left at this temperature for 90 minutes.

The liquor is then drained off and the goods are rinsed twice at 50° C. and twice at 80° C. They are then soaped at the boil for 15 minutes and rinsed cold. A level golden yellow dyeing having good fastness properties is obtained.

If the dyeing is carried out with a mixture of the dyestuffs I and II, the individual components in the mixture show more harmonious dyeing properties than would be expected from their respective dyestuff types, producing a dyeing curve which is flatter than the dyeing curve of I and steeper than the dyeing curve II, that is to say in the mixture claimed (I+II), the dyestuff which is slower to react (formula II) is fixed faster, under the same fixing conditions, than corresponds to its typical fixing properties.

In the case of dyeings in the temperature range from 30° C. to 60° C., in accordance with the dyeing procedure described above, it is to be expected for moderately reactive dyestuffs that fixation takes place very rapidly, given the amounts of fixing agent employed (20 g/l of sodium carbonate).

According to the current state of the art, this would constitute a considerable risk of unlevelness. On the other hand, the use of dyestuffs of low reactivity has the effect, under these conditions, of only slight fixation at the start of dyeing and a gradual increase in the rate of fixation during the heating-up phase.

The fact that the dyestuffs, when mixed with one another, follow a common fixation curve, which is a measure of the positive mutual influencing of the dyestuffs, is unexpected and surprising.

It is furthermore surprising that, in spite of the fixing conditions chosen being ostensibly too demanding, the more reactive component of the mixture dyes the material uniformly and with a high yield. On the other hand, in spite of the reaction conditions being ostensibly too "mild", the less reactive component of the mixture achieves good final yields.

We claim:

1. Dyestuff mixture consisting essentially of at least two reactive dyestuffs, characterised in that it comprises at least one dyestuff having a dichloroquinoxaline reactive radical, of the formula

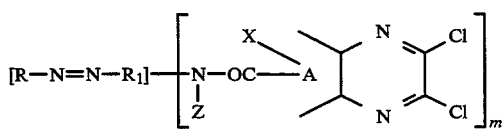

wherein
A denotes six-membered carbocyclic,
X denotes hydrogen,
Z denotes hydrogen or an alkyl group,
R denotes the radical of a diazo component of the benzene or naphthalene series,
$R_1$ denotes the radical of an azo component,
m denotes 1,
and a chlorotriazine dyestuff of the general formula (II)

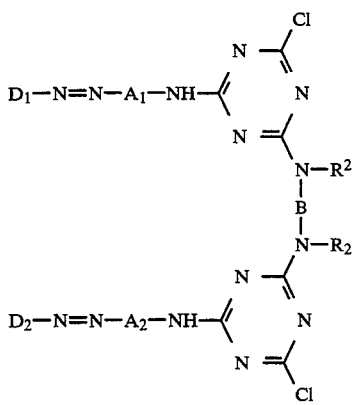

wherein
$R_2$ independently of one another denotes H or $C_1$-$C_4$-alkyl,
$D_1$ and $D_2$ denote components having the structure

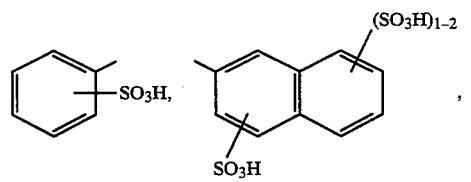

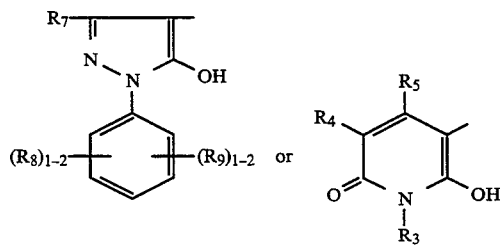

where
$R_3$ = $CH_3$ or $C_2H_5$,
$R_4$ = COOH or $CONH_2$,
$R_5$ = $CH_3$,
$R_7$ = $CH_3$ or COOH,
$R_8$ = H or $SO_3H$ and
$R_9$ = H, Cl or $CH_3$,
$A_1$ and $A_2$ independently of one another denote

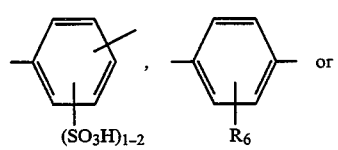

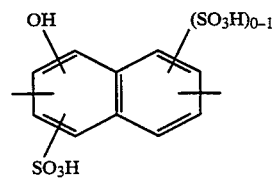

where
$R_6$ = $CH_3$, $C_2H_5$, NHCO—$NH_2$ or NH—CO—$CH_3$, and
B denotes

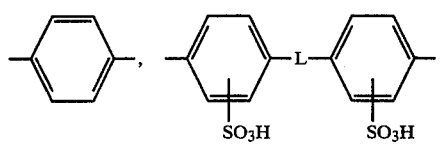
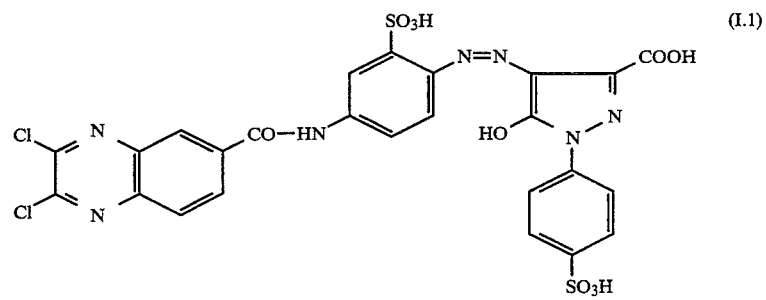
where
L = a single bond, NH—CO—NH or —CH=CH—.
2. Dyestuff mixture according to claim 1, characterised in that the dyestuffs have the same hue.
3. Dyestuff mixture according to claim 1, characterised in that it comprises a dyestuff of the formula
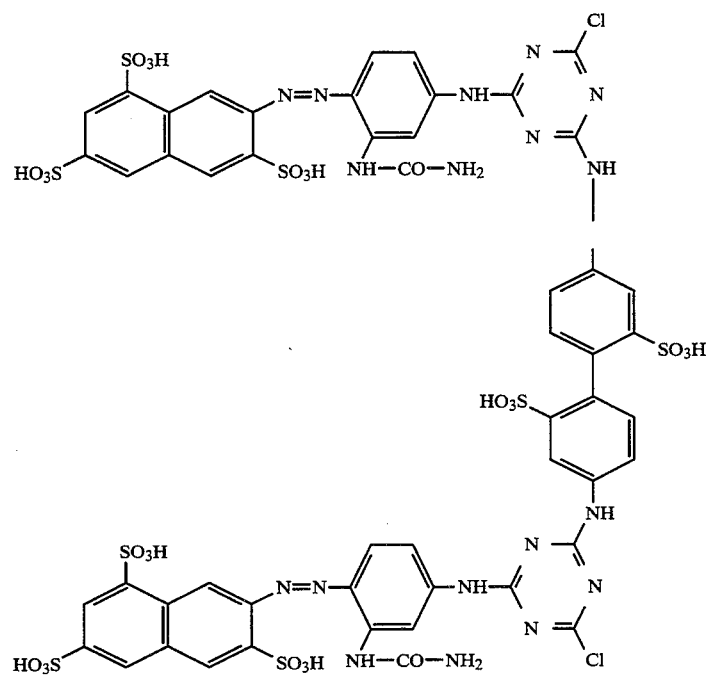
(I.1)
and at least one of the dyestuffs
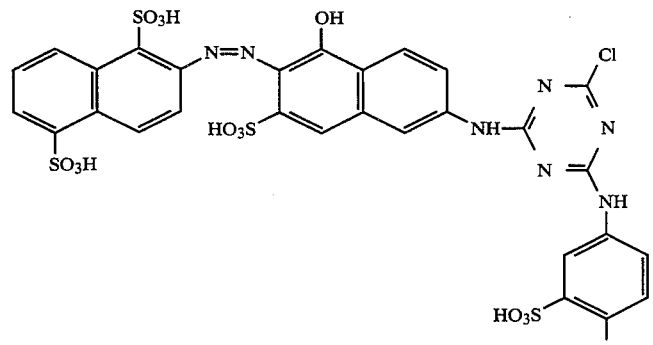

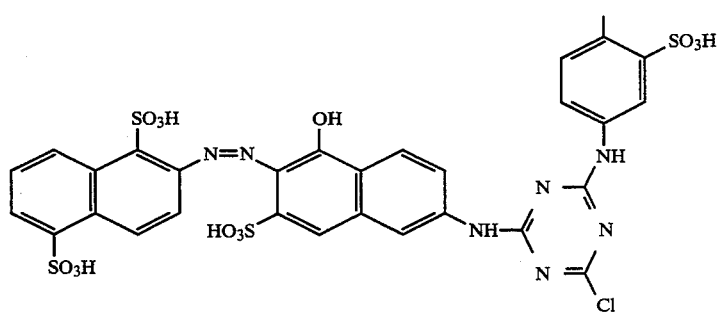
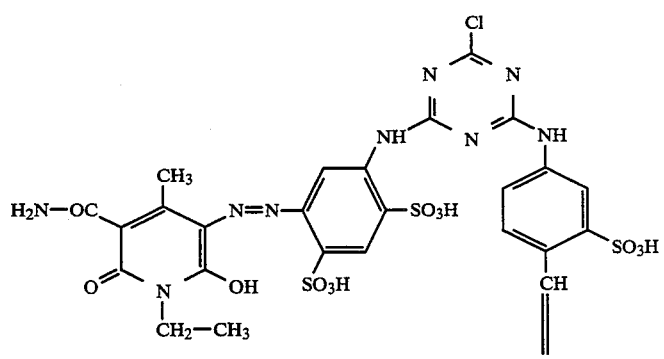
II.3
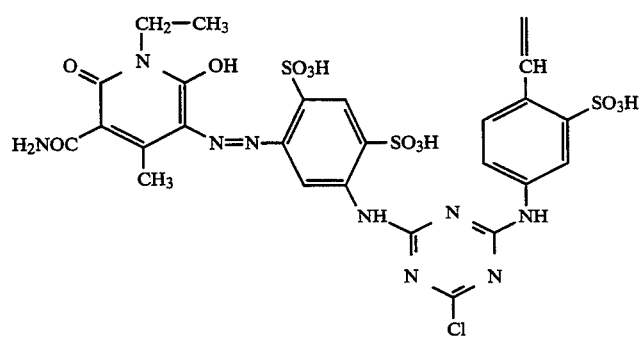
or
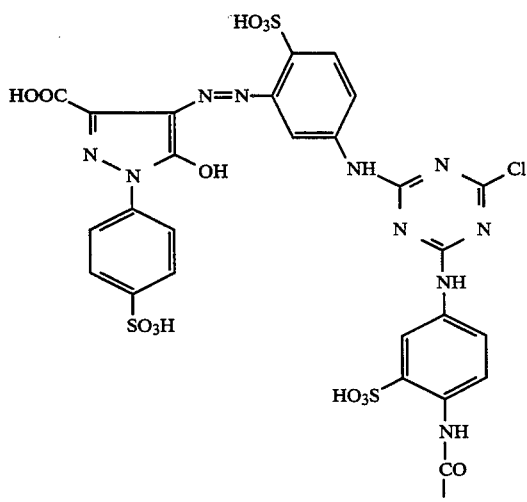
II.4

-continued

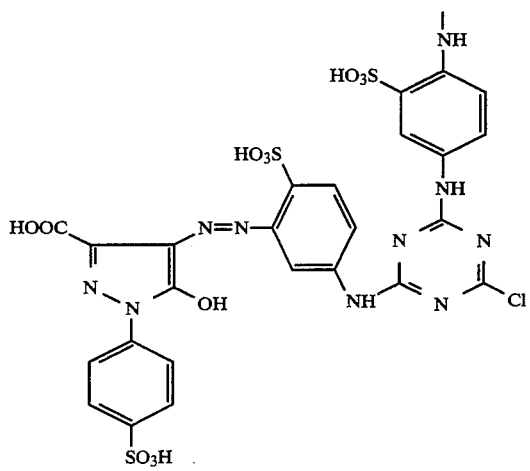

4. Reactive dyestuff mixture according to claim 1, characterised in that it comprises 20 to 80 parts by weight of the dyestuff of the formula (I) and 80 to 20 parts by weight of the dyestuff of the formula (II).

5. Mixtures according to claim 1, characterised in that the dyestuff mixture further comprises 1 to 50 parts by weight of an inorganic salt per 100 parts by weight of mixed dyestuff.

6. Mixtures according to claim 1, characterised in that 100 parts by weight of the mixed dyestuff further comprises 1 to 5 parts by weight of an inorganic buffer.

7. Mixture according to claim 1, characterised in that the mixture further comprises 0.5 to 10 parts by weight of a commercially available organic anionic dispersing agent.

8. Mixture according to claim 1, characterised in that the mixture further comprises 0.5 to 5 parts by weight of a commercially available dust removal agent.

9. Process for dyeing cotton and cotton fibre blends with a mixture of at least two reactive dyestuffs, characterised in that a mixture according to claim 1 is used.

* * * * *